US012799875B2

(12) United States Patent
Dambrine et al.

(10) Patent No.: US 12,799,875 B2
(45) Date of Patent: Nov. 17, 2026

(54) REPAIRING OR RESUMING PRODUCTION OF A COMPONENT MADE OF COMPOSITE MATERIAL

(71) Applicant: SAFRAN, Paris (FR)

(72) Inventors: Bruno Jacques Gérard Dambrine, Moissy-Cramayel (FR); Yann Didier Simon Marchal, Moissy-Cramayel (FR)

(73) Assignee: SAFRAN, Paris (FR)

( * ) Notice: Subject to any disclaimer, the term of this patent is extended or adjusted under 35 U.S.C. 154(b) by 309 days.

(21) Appl. No.: 17/435,234

(22) PCT Filed: Feb. 24, 2020

(86) PCT No.: PCT/FR2020/050341
§ 371 (c)(1),
(2) Date: Aug. 31, 2021

(87) PCT Pub. No.: WO2020/178500
PCT Pub. Date: Sep. 10, 2020

(65) Prior Publication Data

US 2022/0145775 A1 May 12, 2022

(30) Foreign Application Priority Data

Mar. 1, 2019 (FR) ........................................ 1902143

(51) Int. Cl.
*F01D 25/00* (2006.01)

(52) U.S. Cl.
CPC ...... *F01D 25/005* (2013.01); *F05D 2220/323* (2013.01); *F05D 2230/80* (2013.01); *F05D 2300/00* (2013.01)

(58) Field of Classification Search
CPC ............. F01D 25/005; F05D 2220/323; F05D 2230/80; F05D 2300/00; B29C 70/24; B29C 73/10
See application file for complete search history.

(56) References Cited

U.S. PATENT DOCUMENTS 4,916,880 A 4/1990 Westerman
4,961,799 A 10/1990 Cologna et al.
(Continued)

FOREIGN PATENT DOCUMENTS

CA 2 917 165 A1 1/2015
CN 101687368 A 3/2010
(Continued)

OTHER PUBLICATIONS

International Search Report as issued in International Patent Application No. PCT/FR2020/050341, dated Jun. 25, 2020.
(Continued)

*Primary Examiner* — Nathaniel E Wiehe
*Assistant Examiner* — Aye S Htay
(74) *Attorney, Agent, or Firm* — CUSHMAN PARTNERS LLC

(57) ABSTRACT

A gas turbine component made of composite material includes a fiber reinforcement having a three-dimensional weave between a plurality of warp threads and a plurality of weft threads, the fiber reinforcement being densified by a matrix. The densified fiber reinforcement extends in width between a downstream end and an upstream end in an axial direction and in thickness between an inner surface and an outer surface in a radial direction. The fiber reinforcement densified by the matrix has a hollowed-out portion extending through the entire thickness of the fiber reinforcement. A composite material filler piece is present in the free volume of the component delimited by the hollowed-out portion, the
(Continued)

filler piece including a fiber preform having a three-dimensional weave, the fiber preform being densified by a matrix.

17 Claims, 5 Drawing Sheets

(56) References Cited

U.S. PATENT DOCUMENTS

| | | | | |
|---|---|---|---|---|
| 5,190,611 | A | 3/1993 | Cologna et al. | |
| 8,322,971 | B2 | 12/2012 | Coupe et al. | |
| 10,213,964 | B2 * | 2/2019 | Safai | B29C 66/721 |
| 2003/0196305 | A1 * | 10/2003 | Kebbede | C04B 35/653 29/402.09 |
| 2005/0084377 | A1 * | 4/2005 | Dambrine | F04D 29/023 416/223 R |
| 2007/0079920 | A1 * | 4/2007 | Holland | F01D 5/005 156/98 |
| 2007/0095457 | A1 | 5/2007 | Keller et al. | |
| 2009/0282664 | A1 * | 11/2009 | Holzhuter | B64F 5/40 29/402.08 |
| 2010/0024958 | A1 | 2/2010 | Sawicki et al. | |
| 2010/0047541 | A1 * | 2/2010 | Care | B29C 73/10 428/212 |
| 2010/0144227 | A1 | 6/2010 | Coupe et al. | |
| 2015/0040396 | A1 * | 2/2015 | Fremont | B29D 99/0025 29/889.71 |
| 2017/0341320 | A1 | 11/2017 | Mckibbin | |
| 2019/0039338 | A1 * | 2/2019 | Linde | B23K 26/0006 |

FOREIGN PATENT DOCUMENTS

| | | | |
|---|---|---|---|
| CN | 106794639 | A | 5/2017 |
| CN | 109159440 | A | 1/2019 |
| DE | 10 2008 021788 | A1 | 11/2009 |
| DE | 10 2013 003669 | A1 | 3/2014 |
| FR | 2 913 053 | A1 | 8/2008 |
| WO | WO-2019112662 | A1 * | 6/2019 |

OTHER PUBLICATIONS

Middleton, D. H., et al., "Chapter 13: Repair Techniques for Composite Structures," Composite Materials in Aircraft Structures, Jan. 1990, pp. 207-227.

Office Action as issued in Chinese Patent Application No. 202311164404.X, dated Dec. 11, 2025.

* cited by examiner

[Fig. 1]
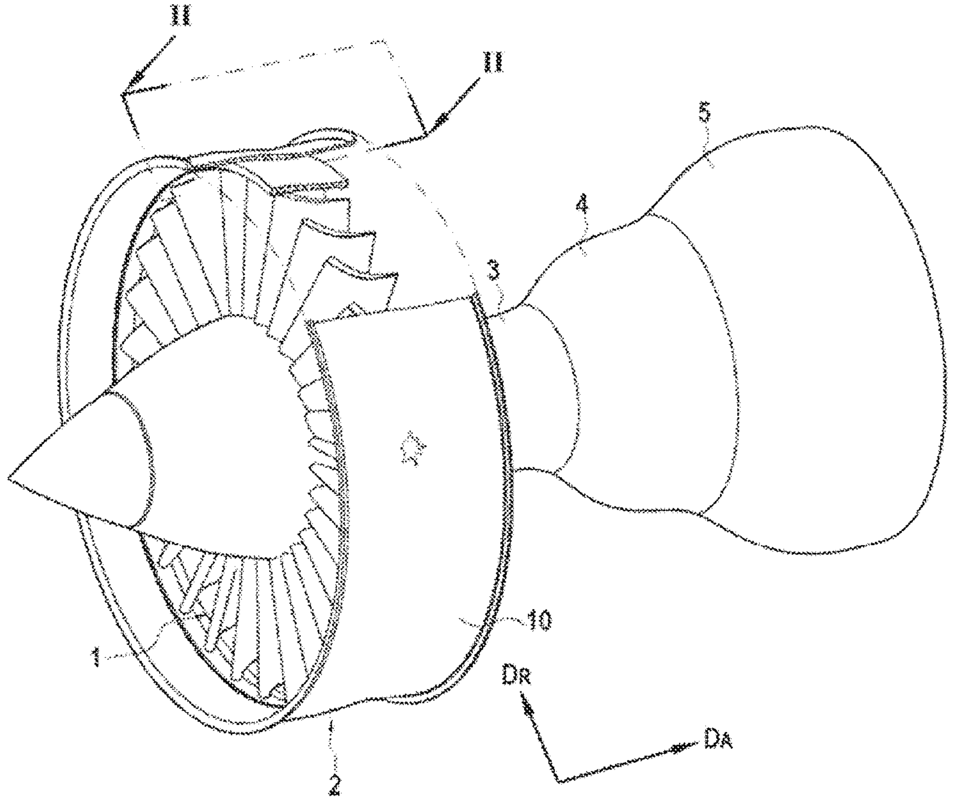

[Fig. 2]
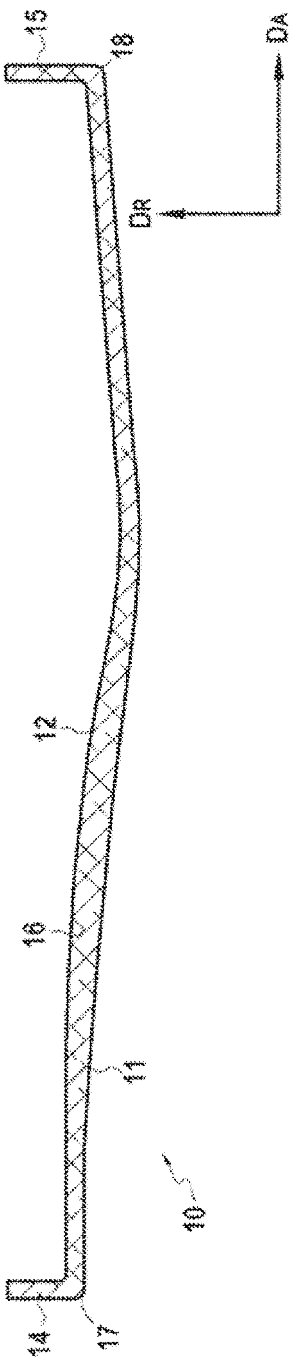

[Fig. 3]
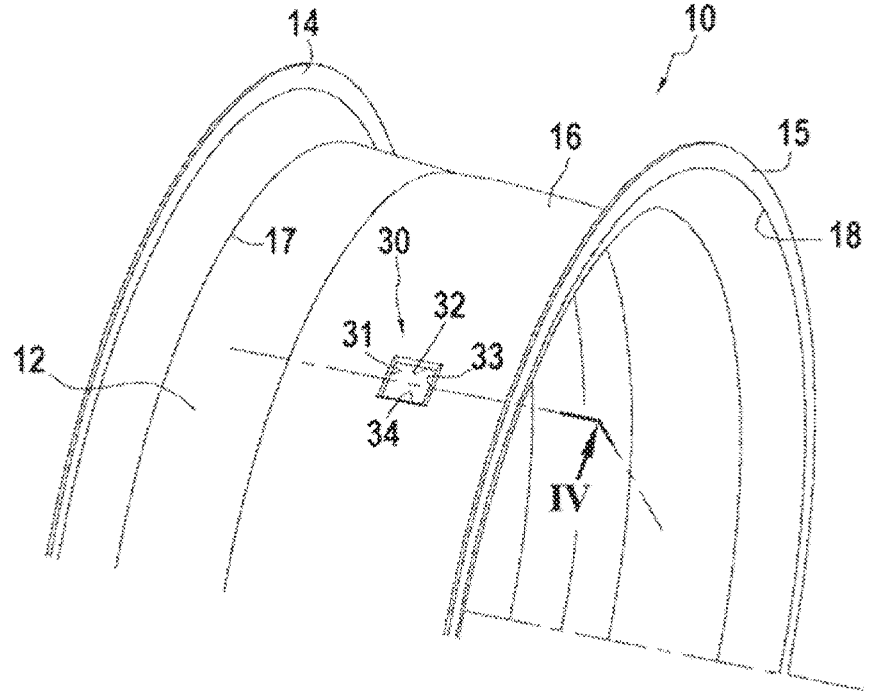
[Fig. 4]
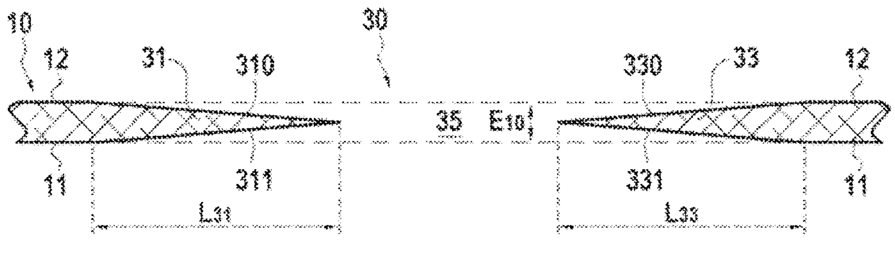

[Fig. 5]
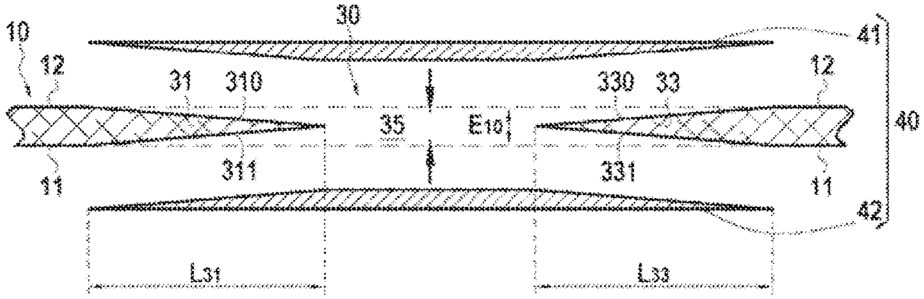
[Fig. 6]
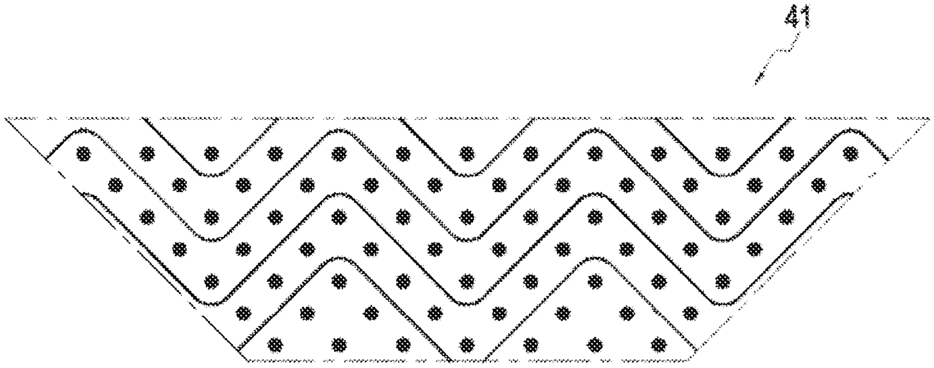
[Fig. 7]
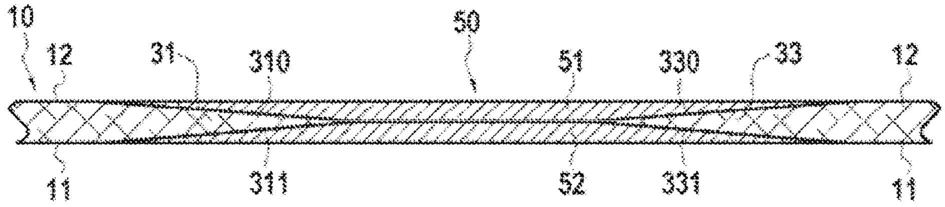

[Fig. 8]
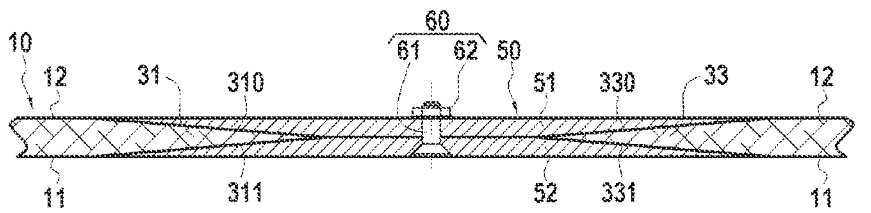
[Fig. 9]
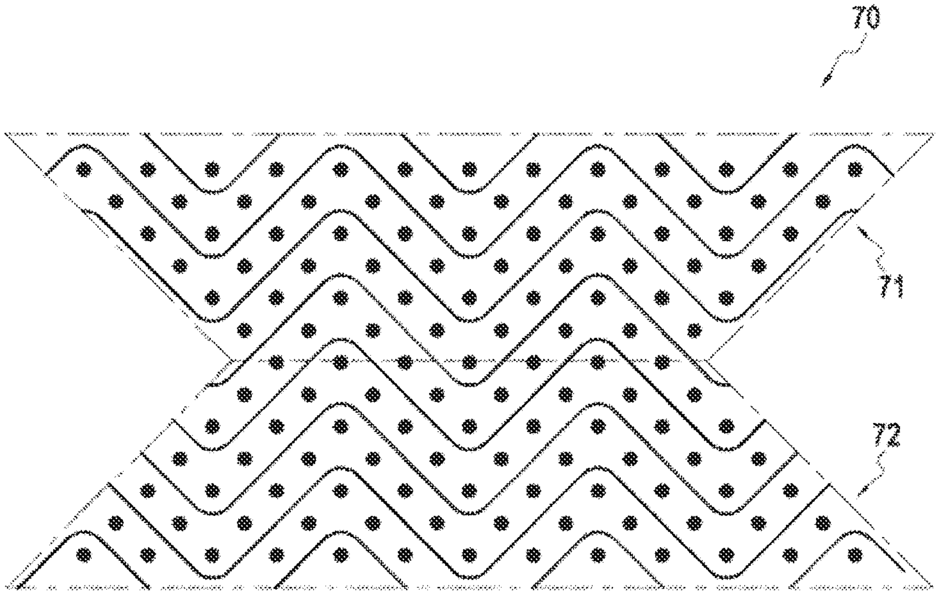

REPAIRING OR RESUMING PRODUCTION OF A COMPONENT MADE OF COMPOSITE MATERIAL

CROSS-REFERENCE TO RELATED APPLICATIONS

This application is the U.S. National Stage of PCT/FR2020/050341, filed Feb. 24, 2020, which in turn claims priority to French patent application number 1902143 filed Mar. 1, 2019. The content of these applications are incorporated herein by reference in their entireties.

TECHNICAL FIELD

The invention relates to gas turbine components made of composite material and, more particularly but not exclusively, to gas turbine casings for aircraft engines such as fan casings.

PRIOR ART

In an aircraft gas turbine engine, the fan casing fulfills several functions. Among other things, it defines the air inlet to the engine, optionally supports an abradable material opposite the fan blade tips and/or a sound wave absorption structure for acoustic treatment at the engine inlet and incorporates or supports a retention shield.

Previously made of metallic material, casings, such as the fan casing, are now made of composite material, i.e., from a fiber preform densified by an organic matrix, which makes it possible to manufacture components with a lower overall mass than these same components when made of metallic material, while having at least equivalent, if not superior, mechanical strength. The manufacture of a composite material fan casing is described in particular in document U.S. Pat. No. 8,322,971.

While the use of composite material casings can reduce the overall mass of the engine, its repair in case of damage or local rework of non-conforming areas in the composite material of the casing can be problematic. Indeed, an existing solution, such as the one described in document US 2007/0095457, consists in bonding a preimpregnated fiber patch onto the damaged area or the area to be reworked of the composite material component, the patch which may consist of one or more fiber plies. However, this type of solution presents a risk of delamination of the bonded patch. Consequently, it is necessary to form additional mechanical connections between the patch and the composite material component, for example with bolt-type members. The addition of such connections increases in the mass of the component and impacts the initial composite material structure of the component (creation of passages in the composite material component for the insertion of the connecting members). This problem also arises in the repair or rework other gas turbine composite material components.

DISCLOSURE OF THE INVENTION

The aim of the invention is to provide a solution for repairing or reworking a gas turbine composite material component, for example a casing, without the drawbacks of the prior art.

This aim is achieved by virtue of a gas turbine component made of composite material, the component comprising a fiber reinforcement having a three-dimensional weave between a plurality of warp threads and a plurality of weft threads, said fiber reinforcement being densified by a matrix, said densified fiber reinforcement extending in width between a downstream end and an upstream end in an axial direction and in thickness between an inner surface and an outer surface in a radial direction, characterized in that the fiber reinforcement densified by the matrix comprises at least one hollowed-out portion extending through the entire thickness of the fiber reinforcement and in that a composite material filler piece is present in the free volume of the component delimited by said at least one hollowed-out portion, the filler piece comprising a fiber preform having a three-dimensional weave, said fiber preform being densified by a matrix.

By using a filler piece comprising a fiber preform with a three-dimensional weave, it is possible to carry out repairs or rework that have a high resistance to delamination. Repairing a damaged area or reworking a non-conforming area in the component is therefore particularly robust while having a very limited impact on the overall mass of the component.

According to a first feature of the component of the invention, each hollowed-out portion comprises at least two opposing edges each comprising first and second bevels, the composite material filler piece comprising a first part having a geometry complementary to a part of the volume of the hollowed-out portion defined between the first bevels of the opposing edges and a second part having a geometry complementary to the other part of the volume of the part of the hollowed-out portion defined between the second bevels of the opposing edges. In this way, the integration and mechanical strength of the filler piece in the hollowed-out portion is optimized.

According to a second feature of the component of the invention, each opposing edge comprising first and second bevels extends over a length corresponding to at least ten times the thickness of the component at the hollowed-out portion. This optimizes the transmission of mechanical loads to the bonding interface between the filler piece and the composite material structure of the component.

According to a third feature of the component of the invention, the first and second parts of the filler piece are bonded together by weaving. This further enhances the mechanical strength of the filler piece.

According to a fourth feature of the component of the invention, the filler piece further comprises at least one fastening member extending into said filler piece. It is thus possible to enhance the strength of the filler piece, if necessary, without impacting the composite structure of the component since the fastening member(s) is (are) fully integrated into the filler piece.

Another subject matter of the invention is an aircraft gas turbine engine having a component according to the invention, for example a fan casing, as well as to an aircraft comprising one or more of these aircraft engines.

Another subject matter of the invention is a process for repairing a composite material component for a gas turbine having a rotational shape, the component comprising a fiber reinforcement having a three-dimensional weave between a plurality of warp threads and a plurality of weft threads, said fiber reinforcement being densified by a matrix, said densified fiber reinforcement extending in width between a downstream end and an upstream end in an axial direction and in thickness between an inner surface and an outer surface in a radial direction, characterized in that it comprises:

- identifying at least one damaged area in the component,
- making a hollowed-out portion by removing the composite material at the damaged area so as to form a hollowed-out portion extending through the entire thickness of the fiber reinforcement, three-dimensionally weaving a fiber preform of the filler piece, placing the filler piece fiber preform in the free volume of the component delimited by the hollowed-out portion, impregnating, before or after placing the filler piece fiber preform in the hollowed-out portion, said preform with a matrix resin precursor, polymerizing the resin into the matrix in order to obtain a composite material filler piece comprising a 3D-woven fiber preform, said filler piece occupying the volume defined by the hollowed-out portion.

According to a first feature of the repair process of the invention, making the hollowed-out portion comprises forming at least two opposing edges each comprising first and second bevels, the filler piece fiber preform comprising a first part having a geometry complementary to a part of the volume of the hollowed-out portion defined between the first bevels of the opposing edges and a second part having a geometry complementary to the other part of the volume of the hollowed-out portion defined between the second bevels of the opposing edges.

According to a second feature of the repair process of the invention, each opposing edge comprising first and second bevels extends over a length corresponding to at least ten times the thickness of the component at the hollowed-out portion.

According to a third feature of the repair process of the invention, the first and second parts of the filler piece fiber preform are bonded together by weaving.

According to a fourth feature of the repair process of the invention, the process further comprises integrating at least one fastening member into the filler piece.

The invention also relates to a process for manufacturing a composite material component for a gas turbine, the process comprising weaving a fibrous texture in the form of a strip into a single piece by three-dimensional weaving, shaping said texture by winding on a support tooling so as to form a fiber reinforcement of the component and densifying the fiber reinforcement by a matrix, said densified fiber reinforcement extending in width between a downstream end and an upstream end in an axial direction and in thickness between an inner surface and an outer surface in a radial direction, characterized in that it comprises:

identifying at least one non-conforming area in the component, making a hollowed-out portion by removing the composite material at the non-conforming area so as to form a hollowed-out portion extending through the entire thickness of the fiber reinforcement, three-dimensionally weaving a fiber preform of the filler piece, placing the filler piece fiber preform in the free volume of the component delimited by the hollowed-out portion, impregnating, before or after placing the filler piece fiber preform in the hollowed-out portion, said preform with a matrix resin precursor, polymerizing the resin into the matrix in order to obtain a composite material filler piece comprising a 3D-woven fiber preform, said filler piece occupying the volume defined by the hollowed-out portion.

According to a first feature of the manufacturing process of the invention, making the hollowed-out portion comprises forming at least two opposing edges each comprising first and second bevels, the filler piece fiber preform comprising a first part having a geometry complementary to a part of the volume of the hollowed-out portion defined between the first bevels of the opposing edges and a second part having a geometry complementary to the other part of the volume of the hollowed-out portion defined between the second bevels of the opposing edges.

According to a second feature of the manufacturing process of the invention, each opposing edge comprising first and second bevels extends over a length corresponding to at least ten times the thickness of the component at the hollowed-out portion.

BRIEF DESCRIPTION OF THE DRAWINGS

FIG. 1 is a perspective view of an aircraft engine comprising a fan casing,

FIG. 2 is a half-view in axial cross-section of the fan casing of the engine of FIG. 1, FIG. 3 is a partial perspective view of the fan casing of FIG. 1 showing the creation of a hollowed-out portion in the fan casing in accordance with an embodiment of the invention, FIG. 4 is a radial cross-sectional view of the hollowed-out portion shown in FIG. 3 along sectional plane IV, FIG. 5 is a radial cross-sectional view of the hollowed-out portion shown in FIG. 3 showing the placement of a filler piece fiber preform in the hollowed-out portion, FIG. 6 illustrates schematically a three-dimensional interlock weave used to make a fiber preform part of a filler piece, FIG. 7 is a radial cross-sectional view showing the presence of a filler piece in the hollowed-out portion shown in FIG. 3, FIG. 8 is a radial cross-sectional view showing the presence of a filler piece provided with a fastening member in the hollowed-out portion shown in FIG. 3, FIG. 9 schematically illustrates a three-dimensional interlock weave used to make a filler piece fiber preform in a single piece.

DESCRIPTION OF THE EMBODIMENTS

The invention generally applies to any gas turbine organic matrix composite component.

The invention will be described hereinafter in the context of its application to an aircraft gas turbine engine fan casing.

Such an engine, as shown very schematically in FIG. 1, comprises, from upstream to downstream in the direction of the gas flow, a fan 1 arranged at the inlet of the engine, a compressor 2, a combustion chamber 3, a high-pressure turbine 4 and a low-pressure turbine 5.

The engine is housed inside a casing comprising several parts corresponding to different elements of the engine. For example, the fan 1 is surrounded by a fan casing 10 which has a rotational shape.

FIG. 2 shows the profile (in axial section) of the fan casing 10, which is here made of an organic matrix composite material, i.e., from a fiber reinforcement of, for example, carbon, glass, aramid or ceramic, densified by a polymer matrix, for example, epoxide, bismaleimide or polyimide. The fiber reinforcement is made from a strip-shaped fibrous texture obtained by three-dimensional weaving in a single piece, the texture being shaped by winding on a support tooling. The fiber reinforcement thus formed is then densified by a matrix. The manufacture of such a casing is described in particular in document U.S. Pat. No. 8,322,971. The inner surface 11 of the casing defines the air inlet duct of the engine.

The casing 10 made of composite material (fiber reinforcement densified by a matrix) has a rotational shape and extends in width between a downstream end 17 and an upstream end 18 in an axial direction $D_A$ and in thickness between an inner surface 11 and an outer surface 12 in a radial direction $D_R$. The casing 10 may be provided with external flanges 14, 15 at its upstream and downstream ends to allow it to be mounted and connected to other elements. Between its upstream 17 and downstream 18 ends, the casing 10 has a variable thickness, with a portion 16 of the casing having a greater thickness than the end portions by progressively connecting thereto. The portion 16 extends on either side of the fan location, upstream and downstream, to form a retention area capable of retaining debris, particles or objects ingested at the engine inlet, or from damage to fan blades, and thrown radially by fan rotation, to prevent them from passing through the casing and damaging other components of the aircraft.

In FIG. 1, the casing 10 has a damaged area 20 resulting from, for example, a blade debris thrown onto the inner surface 11 of the casing. In accordance with the repair process of the invention, the casing is machined at the damaged area 20 to remove the affected composite material. The removal of the composite material is carried out on a given surface of the casing covering at least the area identified as damaged and through the entire thickness of the casing. As shown in FIGS. 3 and 4, a hollowed-out portion 30 that opens onto both the inner surface 11 and the outer surface 12 of the casing 10 is obtained. In the example described here and according to a particular feature of the invention, the edges 31, 32, 33 and 34 of the hollowed-out portion each respectively comprise a first bevel such as the bevels 310 and 330 illustrated in FIG. 4 for the edges 31 and 33, respectively, and a second bevel such as the bevels 311 and 331 illustrated in FIG. 4 for the edges 31 and 33, respectively. The hollowed-out portion 30 defines a free volume of material 35 to be occupied by a filler piece as explained below.

Still in accordance with the repair process of the invention, a filler piece fiber preform is made by three-dimensional weaving to be placed in the volume delimited by the hollowed-out portion 30. In the example described here and as illustrated in FIG. 5, a filler piece fiber preform 40 is composed of a first part 41 and a second part 42.

The three-dimensional weaving of the filler piece fiber preform may be accomplished with an interlock weave with multiple layers of warp and weft threads. FIG. 6 shows an example of interlock weaves for the first part 41 of the filler piece fiber preform 40. In FIG. 6, the weft threads are in cross-section. A three-dimensional interlock weave is a weave in which each warp thread interlinks a plurality of layers of weft threads, with the paths of the warp threads being identical. A progressive increase/decrease in thickness is achieved by adding/removing one or more layers of warp and weft threads. The second part 42 of the filler piece fiber preform 40 may be made with the same weave pattern.

Other modes of three-dimensional weaving can be considered, such as multi-layer weaves with multi-satin or multi-ply weaves. Weaves of this type are described in document US 2010/0144227.

The filler piece fiber preform is preferably woven with fibers of the same nature as those used to make the fiber reinforcement of the casing.

Once the filler piece fiber preform 40 has been produced, it is placed in the free volume 35 delimited by the hollowed-out portion 30.

The first and second parts 41 and 42 of the fiber preform 40 each have a geometry adapted to the portion of the free volume 35 to be filled. More specifically, in the example described here and as illustrated in FIG. 5, the first part 41 has a geometry complementary to the part of the free volume 35 of the hollowed-out portion defined between the first bevels of the opposing edges (first bevels 310 and 330 of the edges 31 and 33 shown in FIG. 5) while the second part 42 has a geometry complementary to the other part of the free volume 35 of the hollowed-out portion 30 defined between the second bevels of the opposing edges (second bevels 311 and 331 of the edges 31 and 33 shown in FIG. 5). Each opposing edge comprising first and second bevels extends over a length corresponding to at least ten times the thickness of the casing at the hollowed-out portion. As illustrated, for example, in FIGS. 4 and 5, the edges 31 and 33 each extend for a length $L_{31}$ and $L_{33}$, respectively, which is at least ten times the value of the thickness $E_{10}$ of the casing 10 at the hollowed-out portion 30. This optimizes the transmission of mechanical loads to the bonding interface between the filler piece and the composite material structure of the casing.

The filler piece fiber preform 40 is impregnated with a matrix precursor resin. The impregnation of the preform 40 may be performed before or after placing the filler piece fiber preform 40 into the hollowed-out portion 30. The resin is preferably selected to correspond to a matrix precursor of the same nature as the matrix with which the casing fiber reinforcement is densified.

The resin is then transformed into a matrix, for example by heat treatment, to obtain, as shown in FIG. 7, a composite material filler piece 50 comprising a 3D-woven fiber preform densified by a matrix, the filler piece 50 occupying the free volume defined by the hollowed-out portion. The composite material filler piece 50 comprises a first part 51 having a geometry complementary to a part of the volume of the hollowed-out portion defined between the first bevels 310 and 330 of the opposing edges 31 and 33 and a second part 52 having a geometry complementary to the other part of the volume of the part of the hollowed-out portion defined between the second bevels 311 and 331 of the opposing edges 31 and 32. The filler piece 50 is completely integrated into the casing structure. The transformation of the resin into a matrix allows the filler piece to adhere to the portions of the composite material of the casing with which it is in contact, in this case the first and second bevels of each edge of the hollowed-out portion. A bonding agent can be further deposited on the bonding interface between the filler piece and the edges of the hollowed-out portion to strengthen the bonding interface.

According to a particular feature of the invention, the mechanical strength of the component can be enhanced by integrating one or more fastening members into the filler piece, such as, for example, the member 60 shown in FIG. 8, which comprises a screw 61 passing through the filler piece 50 and a tightening nut 62 cooperating with the free end of the screw 61. The fastening member(s) have no impact on the structure of the casing because they are not in contact with it but only with the filler piece.

According to another particular feature of the invention, the first and second parts of the filler piece fiber preform may be bonded together by weaving.

FIG. 9 shows an example of interlock weaves of a filler piece fiber preform 70 in which the first and second parts 71 and 72 are bonded together by weaving. In FIG. 9, the weft threads are in cross-section. In this case, the deform ability of the fiber preform 70 is used to insert it into the free volume defined by the hollowed-out portion.

The invention also applies to the reworking of a composite material casing.

In a known way, the production of a composite material casing starts with the formation of a fibrous texture in the form of a strip obtained by three-dimensional weaving such as, for example, an "interlock" weave or a weave according to one of the weaves described in document US 2010/0144227. The fibrous structure can be woven from carbon fiber threads, ceramic threads such as silicon carbide, glass threads, or aramid threads.

The fiber reinforcement of the casing is formed by winding the fibrous texture on a mandrel, the mandrel having a profile corresponding to that of the casing to be made. The fiber reinforcement constitutes a complete tubular fiber preform of the casing forming a single piece. To this end, the mandrel has an outer surface whose profile corresponds to the inner surface of the casing to be produced and two flanges to form components of the fiber preform corresponding to the flanges of the casing.

The fiber reinforcement is then densified by a matrix. The densification of the fiber reinforcement consists in filling the porosity of the reinforcement, in all or part of its volume, with the material constituting the matrix. The matrix can be obtained in a manner known per se according to the liquid process.

The liquid process involves impregnating the fiber reinforcement with a liquid composition containing an organic precursor of the matrix material. The organic precursor is usually in the form of a polymer, such as a resin, optionally diluted in a solvent. The fiber reinforcement is placed in a sealable mold with a casing in the shape of the final molded component. Next, the liquid matrix precursor, such as a resin, is injected throughout the casing to impregnate the entire fibrous portion of the reinforcement.

The transformation of the precursor into an organic matrix, i.e., its polymerization, is carried out by heat treatment, generally by heating the mold, after removing the possible solvent and crosslinking the polymer, the reinforcement being always maintained in the mold having a shape corresponding to that of the component to be produced. The organic matrix can in particular be obtained from epoxy resins, such as, for example, the high-performance epoxy resin sold, or from liquid precursors of carbon or ceramic matrices.

In the case of carbon or ceramic matrix formation, the heat treatment involves pyrolyzing the organic precursor to transform the organic matrix into a carbon or ceramic matrix depending on the precursor used and the pyrolysis conditions. By way of example, liquid carbon precursors can be resins with a relatively high coke content, such as phenolic resins, while liquid ceramic precursors, in particular SiC, can be polycarbosilane (PCS) or polytitanocarbosilane (PTCS) or polysilazane (PSZ) type resins. Several consecutive cycles, from impregnation to heat treatment, can be performed to achieve the desired degree of densification.

The densification of the fiber reinforcement can be carried out by the well-known resin transfer molding (RTM) process. According to the RTM process, the fiber reinforcement is placed in a mold having the shape of the casing to be produced. A thermosetting resin is injected into the internal space between the rigid material part and the mold, which includes the fiber reinforcement. A pressure gradient is generally established in this internal space between the location where the resin is injected and the resin discharge openings in order to control and optimize the impregnation of the reinforcement by the resin.

The resin used can be, for example, an epoxy resin. Resins suitable for RTM processes are well known. They preferably have a low viscosity to facilitate their injection into the fibers. The choice of the temperature class and/or the chemical nature of the resin is determined according to the thermomechanical stresses to which the component must be subjected. Once the resin has been injected into the entire reinforcement, it is polymerized by heat treatment in accordance with the RTM process.

After injection and polymerization, the part is demolded. Finally, the part is trimmed to remove excess resin and the chamfers are machined to obtain a composite material casing like the casing 10 shown in FIGS. 1 and 2.

At the end of this manufacturing process, the casing may have defects, such as one or more "dry" areas corresponding to parts of the casing where the fiber reinforcement is devoid of matrix or does not contain enough matrix. In this case, after the manufacturing of the casing, it is inspected to detect one or more non-conforming areas therein. If this is the case, the process for manufacturing a composite material casing according to the invention further comprises the following steps:

- making a hollowed-out portion by removing the composite material at the non-conforming area so as to form a hollowed-out portion extending through the entire thickness of the fiber reinforcement,
- three-dimensionally weaving a fiber preform of the filler piece,
- placing the filler piece fiber preform in the free volume of the casing delimited by the hollowed-out portion,
- impregnating, before or after placing the filler piece fiber preform in the hollowed-out portion, said preform with a matrix resin precursor,
- transforming the resin into a matrix in order to obtain a composite material filler piece comprising a 3D-woven fiber preform, said filler piece occupying the volume defined by the hollowed-out portion.

The removal of composite material is carried out on a specific surface of the casing covering at least the non-conforming area and the entire thickness of the casing. A hollowed-out portion is thus obtained that opens onto both the inner and outer surfaces of the casing, such as the hollowed-out portion 30 shown in FIGS. 3 and 4, the edges of which each have first and second bevels, respectively. The hollowed-out portion delimits a free volume of material intended to be occupied by a filler piece as explained below.

The filler piece fiber preform is obtained by three-dimensional weaving and may be formed of two distinct parts such as the first and second parts 41 and 42 of the filler piece fiber preform 40 shown in FIG. 5, or of two parts woven together such as the first and second parts 71 and 72 of the filler piece fiber preform 70 shown in FIG. 9.

The filler piece fiber preform is preferably woven with fibers of the same nature as those used to make the fiber reinforcement of the casing. The first and second parts of the filler piece fiber preform each have a geometry adapted to the part of the free volume defined by the hollowed-out portion to be filled as already described above.

Once the filler piece fiber preform has been produced, it is placed in the free volume delimited by the hollowed-out portion.

The filler piece fiber preform is impregnated with a matrix precursor resin. The impregnation of the preform may be performed before or after placing the filler piece fiber preform into the hollowed-out portion. The resin is preferably selected to be a matrix precursor of the same nature as the matrix with which the fiber reinforcement of the casing is densified.

The resin is then transformed into a matrix, for example by heat treatment, in order to obtain a composite material filler piece comprising a 3D-woven fiber preform densified by a matrix such as the composite material filler piece 50 shown in FIG. 7, the filler piece occupying the free volume defined by the hollowed-out portion.

According to a particular feature of the invention, the mechanical strength of the component can be enhanced by integrating one or more fastening members into the filler piece, such as, for example, the member 60 shown in FIG. 8, which comprises a screw 61 passing through the filler piece 50 and a tightening nut 62 cooperating with the free end of the screw 61. The fastening member(s) have no impact on the structure of the casing because they are not in contact with it but only with the filler piece.

The invention claimed is:

1. A gas turbine component made of composite material, the component comprising a fiber reinforcement having a three-dimensional weave between a plurality of warp threads and a plurality of weft threads, said fiber reinforcement being densified by a matrix, said densified fiber reinforcement extending in width between a downstream end and an upstream end in an axial direction and in thickness between an inner surface and an outer surface in a radial direction, the axial and radial directions being defined with reference to an axis of the component, wherein the fiber reinforcement densified by the matrix comprises at least one hollowed-out portion extending through an entire thickness of the fiber reinforcement, wherein a composite material filler piece is present in a free volume of the component delimited by said at least one hollowed-out portion, the composite material filler piece comprising a fiber preform having a three-dimensional weave, said fiber preform being densified by a matrix, and wherein each hollowed-out portion has at least two opposing edges, each of the at least two opposing edges comprising first and second bevels, the fiber preform of the composite material filler piece consisting of (a) a first three-dimensionally woven single preform having a geometry complementary to a part of a volume of the hollowed-out portion defined between the first bevels of the opposing edges and (b) a second three-dimensionally woven single preform having a geometry complementary to the other part of the volume of the hollowed-out portion defined between the second bevels of the opposing edges, and the first and second parts of the composite material filler piece are woven to each other so as to be bonded together by weaving.

2. The component as claimed in claim 1, wherein each opposing edge comprising first and second bevels extends over a length corresponding to at least ten times the entire thickness of the component at the hollowed-out portion.

3. The component as claimed in claim 1, wherein the composite material filler piece further comprises at least one fastening member extending into said composite material filler piece.

4. An aircraft gas turbine engine having a composite material component as claimed in claim 1.

5. An aircraft comprising one or more aircraft gas turbine engines as claimed in claim 4.

6. The component as claimed in claim 1, wherein, in the three-dimensional weave of the fiber reinforcement of the component and of the composite material filler piece, each warp thread interlinks a plurality of layers of weft thread.

7. A process for repairing a composite material component for a gas turbine, the component comprising a fiber reinforcement having a three-dimensional weave between a plurality of warp threads and a plurality of weft threads, said fiber reinforcement being densified by a matrix, said densified fiber reinforcement extending in width between a downstream end and an upstream end in an axial direction and in thickness between an inner surface and an outer surface in a radial direction, the axial and radial directions being defined with reference to an axis of the component, the process comprising:

identifying at least one damaged area in the component, making a hollowed-out portion by removing the composite material at the at least one damaged area so as to form a hollowed-out portion extending through an entire thickness of the fiber reinforcement, three-dimensionally weaving a fiber preform of a filler piece, placing the composite material filler piece fiber preform in a free volume of the component delimited by the hollowed-out portion, impregnating, before or after placing the filler piece fiber preform in the hollowed-out portion, said preform with a matrix resin precursor, polymerizing the resin into the matrix in order to obtain a composite material filler piece comprising a 3D-woven fiber preform, said composite material filler piece occupying the volume defined by the hollowed-out portion, wherein making the hollowed-out portion comprises forming at least two opposing edges, each of the at least two opposing edges comprising first and second bevels, the filler piece fiber preform consisting of (a) a first three-dimensionally woven single preform having a geometry complementary to a part of a volume of the hollowed-out portion defined between the first bevels of the opposing edges and (b) a second three-dimensionally woven single preform having a geometry complementary to the other part of the volume of the hollowed-out portion defined between the second bevels of the opposing edges, and the first and second parts of the filler piece fiber preform are woven to each other so as to be bonded together by weaving.

8. The repair process as claimed in claim 7, wherein each opposing edge comprising first and second bevels extends over a length corresponding to at least ten times the entire thickness of the component at the hollowed-out portion.

9. The repair process as claimed in claim 7, further comprising integrating at least one fastening member into the composite material filler piece.

10. A process for manufacturing a composite material component for a gas turbine engine, the process comprising weaving a fibrous texture in the form of a strip into a single piece by three-dimensional weaving, shaping said texture by winding on a support tooling so as to form a fiber reinforcement of the component and densifying the fiber reinforcement by a matrix, said densified fiber reinforcement extending in width between a downstream end and an upstream end in an axial direction and in thickness between an inner surface and an outer surface in a radial direction, the axial and radial directions being defined with reference to an axis of the component, the process comprising:

identifying at least one non-conforming area in the component, making a hollowed-out portion by removing the composite material at the at least one non-conforming area so as to form a hollowed-out portion extending through an entire thickness of the fiber reinforcement, three-dimensionally weaving a fiber preform of the filler piece, placing the filler piece fiber preform in a free volume of the component delimited by the hollowed-out portion, impregnating, before or after placing the filler piece fiber preform in the hollowed-out portion, said preform with a matrix resin precursor, polymerizing the resin into the matrix in order to obtain a composite material filler piece comprising a 3D-woven fiber preform, said composite material filler piece occupying the volume defined by the hollowed-out portion, wherein making the hollowed-out portion comprises forming at least two opposing edges, each of the at least two opposing edges comprising first and second bevels, the filler piece fiber preform consisting of (a) a first three-dimensionally woven single preform having a geometry complementary to a part of a volume of the hollowed-out portion defined between the first bevels of the opposing edges and (b) a second three-dimensionally woven single preform having a geometry complementary to the other part of the volume of the hollowed-out portion defined between the second bevels of the opposing edges.

11. The process as claimed in claim 10, wherein each opposing edge comprising first and second bevels extends over a length corresponding to at least ten times the entire thickness of the component at the hollowed-out portion.

12. A gas turbine component made of composite material, the component comprising a fiber reinforcement having a three-dimensional weave between a plurality of warp threads and a plurality of weft threads, said fiber reinforcement being densified by a matrix, said densified fiber reinforcement extending in width between a downstream end and an upstream end in an axial direction and in thickness between an inner surface and an outer surface in a radial direction, wherein the fiber reinforcement densified by the matrix comprises at least one hollowed-out portion extending through the entire thickness of the fiber reinforcement and wherein a composite material filler piece is present in the free volume of the component delimited by said at least one hollowed-out portion, the filler piece consisting of a single three-dimensionally woven single-fiber preform that is densified by a matrix and having a volume that is complementary to the free volume of the component.

13. The component of claim 12, wherein each hollowed-out portion has at least two opposing edges, each of the at least two opposing edges comprising first and second bevels, the composite material filler piece comprising a first part having a geometry complementary to a part of the volume of the hollowed-out portion defined between the first bevels of the opposing edges and a second part having a geometry complementary to the other part of the volume of the part of the hollowed-out portion defined between the second bevels of the opposing edges.

14. A process for repairing a composite material component for a gas turbine, the component comprising a fiber reinforcement having a three-dimensional weave between a plurality of warp threads and a plurality of weft threads, said fiber reinforcement being densified by a matrix, said densified fiber reinforcement extending in width between a downstream end and an upstream end in an axial direction and in thickness between an inner surface and an outer surface in a radial direction, the process comprising:

identifying at least one damaged area in the component, making a hollowed-out portion by removing the composite material at the damaged area so as to form a hollowed-out portion extending through the entire thickness of the fiber reinforcement, three-dimensionally weaving a single fiber preform of the filler piece, placing the filler piece formed by the single fiber preform in the free volume of the component delimited by the hollowed-out portion, impregnating, before or after placing the filler piece formed by the single fiber preform in the hollowed-out portion, said preform with a matrix resin precursor, polymerizing the resin into the matrix in order to obtain a composite material filler piece consisting of a single 3D-woven fiber preform, said composite material filler piece occupying the volume defined by the hollowed-out portion.

15. The repair process as claimed in claim 14, wherein making the hollowed-out portion comprises forming at least two opposing edges, each of the at least two opposing edges comprising first and second bevels, the filler piece fiber preform comprising a first part having a geometry complementary to a part of the volume of the hollowed-out portion defined between the first bevels of the opposing edges and a second part having a geometry complementary to the other part of the volume of the hollowed-out portion defined between the second bevels of the opposing edges.

16. The repair process as claimed in claim 15, wherein each of the first and second parts of the composite material filler piece is previously woven based on a geometry of the at least one hollowed-out portion such that a geometry of said composite material filler piece that consists of the first and second parts, after being inserted into the free volume of the at least one hollowed-out portion, is complementary to said free volume.

17. The repair process as claimed in claim 14, wherein making the hollowed-out portion comprises forming at least two opposing edges each comprising first and second bevels, the filler piece fiber preform comprising a first part having a geometry complementary to a part of the volume of the hollowed-out portion defined between the first bevels of the opposing edges and a second part having a geometry complementary to the other part of the volume of the hollowed-out portion defined between the second bevels of the opposing edges.

* * * * *